US007055239B2

(12) United States Patent
Ochsner

(10) Patent No.: US 7,055,239 B2
(45) Date of Patent: Jun. 6, 2006

(54) INDEX CUTTER

(75) Inventor: August Ochsner, Schmerikon (CH)

(73) Assignee: Ochsner & Co. Buchbindereimaschinen, Schmerikon (CH)

( * ) Notice: Subject to any disclaimer, the term of this patent is extended or adjusted under 35 U.S.C. 154(b) by 156 days.

(21) Appl. No.: 10/495,263

(22) PCT Filed: Nov. 15, 2001

(86) PCT No.: PCT/CH01/00670

§ 371 (c)(1),
(2), (4) Date: Jun. 23, 2004

(87) PCT Pub. No.: WO03/041970

PCT Pub. Date: May 22, 2003

(65) Prior Publication Data

US 2005/0062280 A1 Mar. 24, 2005

(51) Int. Cl.
*B23C 3/00* (2006.01)
*B26D 3/14* (2006.01)
*B42F 21/12* (2006.01)

(52) U.S. Cl. ........................ 29/558; 409/132; 409/143; 409/138; 83/904; 283/36

(58) Field of Classification Search .......... 29/557–558; 409/132, 143, 138; 83/904; 283/36–38
See application file for complete search history.

(56) References Cited

U.S. PATENT DOCUMENTS

| | | | | |
|---|---|---|---|---|
| 343,175 | A * | 6/1886 | Hewes | 83/904 |
| 396,742 | A * | 1/1889 | Hewes | 83/904 |
| 399,250 | A * | 3/1889 | Donnell | 83/904 |
| 853,087 | A * | 5/1907 | Johnson | 83/904 |
| 1,381,814 | A * | 6/1921 | Farkas et al. | 83/904 |
| 2,489,825 | A * | 11/1949 | Sieb | 83/904 |
| 2,620,874 | A * | 12/1952 | Chase | 83/904 |
| 2,763,324 | A * | 9/1956 | Finck et al. | 83/904 |
| 2,874,464 | A * | 2/1959 | Petersen | 30/229 |
| 3,618,463 | A * | 11/1971 | Briney et al. | 409/143 |
| 4,072,076 | A * | 2/1978 | Miles | 83/300 |
| 5,216,961 | A * | 6/1993 | Gray | 83/904 |
| 5,647,714 | A | 7/1997 | Lundberg | |
| 6,095,208 | A * | 8/2000 | Aguilar et al. | 144/133.1 |
| 6,966,552 | B1 * | 11/2005 | Trovinger et al. | 83/904 |

FOREIGN PATENT DOCUMENTS

| | | | |
|---|---|---|---|
| DE | 2300518 A | * | 7/1974 |
| GB | 2184189 A | * | 6/1987 |
| WO | WO-93/24286 A1 | * | 12/1993 |
| WO | WO 93/25427 | | 12/1993 |

* cited by examiner

*Primary Examiner*—Erica Cadugan
(74) *Attorney, Agent, or Firm*—Breiner & Breiner, L.L.C.

(57) ABSTRACT

The invention relates to a device for producing a book page index for facilitating the search for certain sections in a book. The device includes a bearing surface (1) on which a pile (3) of pages is placed. According to the invention, an index notch or thumb section (31) is to be formed on the upper region of the pile, along the front edge (7). To this end, preferably a circular, disk-shaped cutter head (17) is used, the cutter head having a cutting contour (21) on the circumference thereof. The device includes at least one displacement device (19) for moving the support and the cutter head towards or away from each other, so that the notch or thumb section to be formed can be produced on the front edge by means of the cutter head. The height of the thumb index can be set by lowering the bearing surface.

5 Claims, 1 Drawing Sheet

INDEX CUTTER

FIELD OF INVENTION

This invention relates to a design for production of a book page index and to a process for producing the index.

BACKGROUND OF INVENTION

It is desirable in the case of bibles, reference works, dictionaries, telephone books, timetables, and the like for it to be possible quickly to find a specific heading or a specific subject area by means of a page index, also called a thumb index. Book or page indexes such as this may be in the form either of tabs projecting from fore edges of a page or in the form of notches or recesses in the fore edges of a page by which an indication of the heading or subject area is then to be seen on the page following the page section thereby made visible. Indexes in the form of projecting tabs are generally undesirable, since they, being relatively unprotected, are subjected to heavy stress and are relatively quickly worn off. On the other hand, indexes (thumb indexes) in the form of thumb sections or recesses are relatively well protected, since they extend sideways into the page stack from the fore edge of the pages. Production of these indexes is, of course, relatively labor-intensive, and, because of the manual production usually employed their shape is for the most part irregular and the indexes exhibit a so-called stepped effect.

OBJECTS AND BRIEF DESCRIPTION OF INVENTION

Consequently, one object of the present invention is production of a book or page index of the conventional type in a simple manner, an index without the known disadvantages.

A design is proposed for production of page or book indexes, often also called thumb indexes, one having at the minimum a contact area for configuration of a pack or stack of book pages, a circular milling machine, a "finghol" cutting miller, and a feed mechanism for relative movement of milling cutter and page stack toward and away from each other.

Provision is made such that, in order to produce the book page index or thumb index, a contact surface is positioned against the subject area to be designated or the stack of pages preceding the heading to be designated, preferably by means of a pressure application element along the fore edge of the pages on the contact surface, and the thumb section or recess is then produced by means of a preferably circular milling head or so-called finghol milling cutter in the form of a disk. This is effected in that preferably the milling head is moved against the upper fore edge of the stack of pages to which pressure is applied and is moved inward into the page stack at a prescribed distance from the upper edge of the pages, so that the thumb section or recess thereby produced extends a specific distance along the front page edge and over a number of pages of the stack. After the cutting process has been completed the milling cutter is again moved back, the pressure application element is removed, and another number of pages are deposited on the stack, after which this additional stack of pages is pressed firmly against the contact surface, together with the stack of pages originally deposited. Another thumb section or recess is now produced in addition to the ones or those already made, a recess extending laterally and offset downward, and again one extending from the now uppermost fore edge of the increased stack of pages.

This process is carried out as many times as there are indexes or subdivisions provided in the book. For example, the subdivision may cover all the letters of the alphabet if individual indexes or areas are provided for all letters in a telephone book.

Other preferred alternative embodiments of the design claimed for the invention or of the process claimed for the invention are specified in the dependent clauses.

BRIEF DESCRIPTION OF DRAWINGS

The invention will now be explained in greater detail, with reference to the attached figures, in which.

DETAILED DESCRIPTION OF THE INVENTION.

Figure 1:
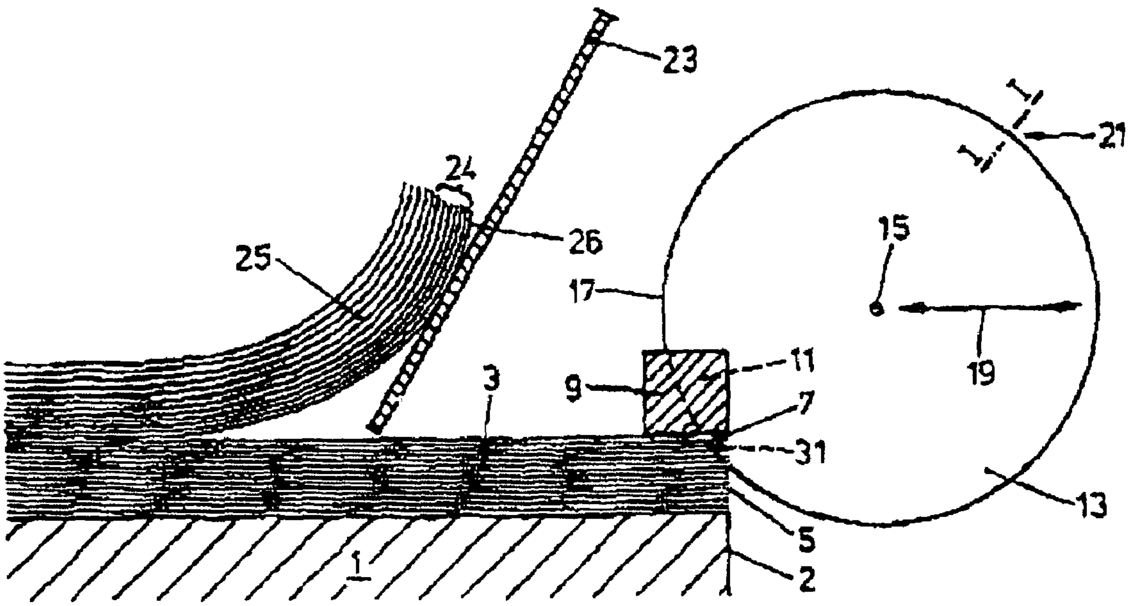
FIG. 1 presents a diagram in cross-section of a design for production of an individual thumb section, FIGS. 2*a* and 2*b*, in cross-section, the external outline of a milling head along line I—I in FIG. 1, FIG. 3 a schematic top view of a book or page or thumb index, and FIG. 4 a side view of a section of an index as illustrated in FIG. 3.

FIG. 1 shows a cross-section of a diagram of a design for production of a book or page index, also often referred to as a thumb index, as claimed for the invention. A page stack 3 is positioned against a contact surface 1, in such a way that preferably the fore edges 5 of the stack are aligned with a side edge 2 of the contact surface 1. By preference a contact pressure part 9 is provided in the area of the upper fore edge 7 of the page stack for the purpose of pressing the page stack firmly against the contact surface 1.

The thumb section or recess claimed for the invention is produced by means of a circular cutter head 13 which is mounted so as to rotate about an axis 15. The axis 15 of rotation of the cutter head 13 is for this purpose moved in the direction indicated by the arrow 19 against the upper fore edge 7 of the page stack 3 so that the external cutter profile 17 is moved in the area of the page stack. This makes it possible to provide a corresponding recess 13 in the contact pressure part 9, through which recess the cutter head 13 may move freely. The cutter head 13 is moved far enough into the stack 3 so that a thumb section 31 of prescribed depth is produced. The width of the thumb section or recess 31 is determined by the thickness of the disk-shaped cutter head 13. The height of the thumb section is determined by the adjustable height of the contact surface.

The remaining pages 25 of the book to be processed are kept in an upwardly folded position by means of a stop device 23. The reference number 24 identifies diagrammatically the page area of the book in which the thumb section indicated in FIG. 1 is to be produced. The designation identifying the page area 24 in the front section 26 which is to be made visible by the thumb section 31 to be produced is situated on the lowermost page of the page stack 24.

Depending on the design of the peripheral area 17 of the cutter head 13, a thumb notch 31 or a curved, cylindrical recess adapted to the anatomy, such as that of the thumb, is obtained.

Figure 2A:
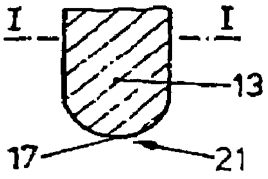
Figure 2B:
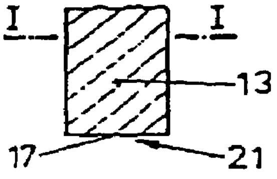

An example of the way in which the peripheral area 17 of the cutter head 13 may be designed is illustrated by diagrams in FIGS. 2*a* and 2*b*. This design extends along line I—I in FIG. 1 and this area is identified by the reference number 21.

FIG. 2*a* illustrates a mostly rounded outline 21 in the peripheral area 17 of the cutter head 13.

FIG. 2*b* illustrates a rectangular outline 21' in the peripheral area 17 of the cutter head 13. Different thumb notches or recesses 31 are accordingly obtained.

Figure 3:
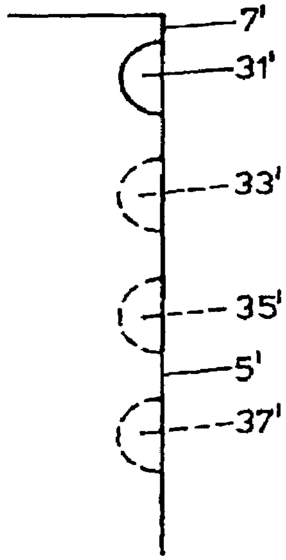

A book or page or thumb index as claimed for the invention is illustrated in FIG. 3. The pages of the topmost recess are mostly folded back so that the reference number 31' of the topmost index in the fore edge 7 of the stack situated underneath it is visible. This reference number 31' may, for example, be a letter of the alphabet, identification of the chapter of the book situated underneath, or a number or series of numbers. Other thumb sections with corresponding reference fields 33', 35', and 37', offset and only symbolically indicated, since they are not visible, are present in the fore edge 5' of the book page stack. Reference field 33' becomes visible when the pages positioned above it likewise are moved away by a finger.

Figure 4:
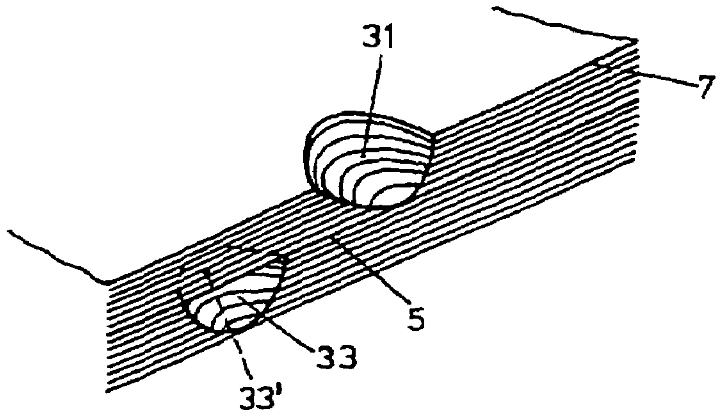

FIG. 4 presents a side view of two consecutive thumb sections or recesses 31 and 33, but with the book pages moved through an angle of precisely 180E relative to the position shown in FIG. 3 and stacked in reverse order. In other words, the page of the upper recess or thumb section 31 containing the reference field 31' is folded back so that the thumb section 31 becomes visible.

The reference field 33' of the thumb section 33 as well is not visible, since this reference or indicator field faces in the direction of thumb section 33, that is, downward. FIG. 4 illustrates both the lateral offset of the thumb sections and the vertical displacement of the book page stack.

The design or designs presented in FIGS. 1 to 4 of course represent only examples more clearly illustrating the present invention.

Thus, for example, the specific design of the cutter head, which may be a so-called finghol milling cutter, for example, is not a primary object of this invention, since such milling cutters are very well known in the state of the art. In particular, the design of the peripheral profile 17 of this milling cutter may be adapted to the thumb sections or recesses to be produced.

Both a manual and an automated drive may be used for displacement of the axis of rotation 15 of the cutter head toward or away from the page stack to be processed. It is even possible to operate the cutter head 13 while stationary and, for example, move the contact surface 1 with the page stack 3 positioned on it against the cutter.

The thumb sections or recesses shown in FIGS. 3 and 4 may also be of a different design, and in particular may be of different dimensions.

The invention claimed is:

1. A process for producing a book page index for finding sections in a book, comprising depositing a page stack preceding a given section on a contact surface and folding upward remaining pages and subsequently moving a rotating milling cutter head transversely in relation to a fore side of the page stack against an upper fore edge to provide a thumb recess of predetermined depth.

2. The process as claimed in claim 1, wherein the moving of the cutter head to and from a given page stack and provision of the thumb recess is carried out repeatedly, in such a way that thumb recesses are provided in laterally and vertically offset positions in the page stack, and wherein a subject to be identified by a given thumb recess is deposited on the page stack positioned on the contact surface between production of two consecutive thumb recesses.

3. The process as claimed in claim 1 or 2, wherein height in the thumb recess is produced by lowering of the contact surface.

4. The process as claimed in claim 1, wherein the depositing of the page stack on the contact surface is manual.

5. The process as claimed in claim 1, wherein the depositing of the page stack on the contact surface is automatic.

* * * * *